United States Patent
Bradley

(10) Patent No.: US 11,395,028 B2
(45) Date of Patent: *Jul. 19, 2022

(54) TRANSMISSION AND CONSUMPTION OF TIME-SHIFTED CONTENT IN A ONE-WAY COMMUNICATION ENVIRONMENT

(71) Applicant: TIVO CORPORATION, San Jose, CA (US)

(72) Inventor: Bruce Bradley, Wayne, PA (US)

(73) Assignee: TIVO CORPORATION, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/243,944

(22) Filed: Jan. 9, 2019

(65) Prior Publication Data

US 2019/0387269 A1 Dec. 19, 2019

Related U.S. Application Data

(63) Continuation of application No. 13/647,625, filed on Oct. 9, 2012, now Pat. No. 10,225,597.

(51) Int. Cl.
| | |
|---|---|
| *H04N 21/41* | (2011.01) |
| *H04N 21/45* | (2011.01) |
| *H04N 21/466* | (2011.01) |
| *H04N 21/482* | (2011.01) |
| *H04N 21/422* | (2011.01) |
| *H04N 21/6587* | (2011.01) |

(52) U.S. Cl.
CPC ..... *H04N 21/4122* (2013.01); *H04N 21/4222* (2013.01); *H04N 21/4516* (2013.01); *H04N 21/4532* (2013.01); *H04N 21/4668* (2013.01); *H04N 21/4821* (2013.01); *H04N 21/6587* (2013.01)

(58) Field of Classification Search
CPC .......... H04N 21/4122; H04N 21/6587; H04N 21/4222; H04N 21/4668; H04N 21/4532
See application file for complete search history.

(56) References Cited

U.S. PATENT DOCUMENTS

| | | | | |
|---|---|---|---|---|
| 2006/0090191 | A1* | 4/2006 | Takagi | H04N 21/426 725/153 |
| 2007/0074240 | A1* | 3/2007 | Addington | H04N 21/2543 725/25 |
| 2008/0046572 | A1* | 2/2008 | Jagels | H04L 29/06027 709/227 |
| 2008/0127285 | A1* | 5/2008 | Broberg | H04N 21/234309 725/105 |
| 2008/0141317 | A1* | 6/2008 | Radloff | H04N 5/76 725/87 |
| 2009/0248886 | A1* | 10/2009 | Tan | H04L 12/1836 709/231 |

(Continued)

*Primary Examiner* — Benjamin R Bruckart
*Assistant Examiner* — Akshay Doshi
(74) *Attorney, Agent, or Firm* — Haley Guiliano LLP

(57) ABSTRACT

Aspects of the disclosure relate to control of transmission and consumption of content in a device, such as an end-point rendering device. The content can include linear-programming content assets and/or time-shifted content assets. Consumption can be mediated by a control device that can coordinate the functional interaction between the device and a content distribution network node or an access network node that can supply the content and related information.

20 Claims, 11 Drawing Sheets

(56) References Cited

U.S. PATENT DOCUMENTS

| | | | |
|---|---|---|---|
| 2010/0313034 A1* | 12/2010 | Senshu | H04N 5/85 |
| | | | 713/185 |
| 2011/0010741 A1* | 1/2011 | Liao | H04N 7/17318 |
| | | | 725/51 |
| 2012/0110625 A1* | 5/2012 | Bae | H04N 21/4122 |
| | | | 725/86 |

* cited by examiner

TRANSMISSION AND CONSUMPTION OF TIME-SHIFTED CONTENT IN A ONE-WAY COMMUNICATION ENVIRONMENT

CROSS REFERENCE TO RELATED PATENT APPLICATION

This application is a continuation of U.S. patent application Ser. No. 13/647,625, filed Oct. 9, 2012, which is herein incorporated by reference in its entirety.

BACKGROUND

Certain user devices consume digital media in downstream-only modalities, and certain user devices may be unable to deliver information upstream as requested by a network, for example, or due to operational configuration. While non-interactive consumption of content in such devices generally is satisfactory, interactive consumption of content generally entails upstream delivery of control information. Consumption of interactive content associated with rich digital services (e.g., pay-par-view (PPV) programming, video on demand (VOD), digital video recordings, and the like, and others) may be unavailable to such devices.

SUMMARY

It is to be understood that this summary is not an extensive overview of the disclosure. This summary is illustrative and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The disclosure relates, in one aspect, to transmission and/or consumption of content in a device that can function as a one-way device, such as an end-point rendering device, wherein the transmission and/or consumption is mediated by a control device that can coordinate the interaction between a content distribution network node and the one-way device. The content, which may be interactive, can comprise data, music, video, advertisement, service notifications, or the like, and the device can be a customer premises equipment (CPE) or a user device, such as an end-point electronic device, or a device that is part of a network (e.g., a communication network, a home network, a utilities network, or combinations thereof) having various levels of computational capability. In certain embodiments, the electronic device can be a rendering device without computing functionality that renders a previously decoded signal. In networks such as packet-switched networks, which can include a cable/fiber optic network or a satellite-based network, the available media can comprise linear-programming assets or non-linear assets, such as per-per-view (PPV) content assets or video-on-demand (VOD) content assets.

The control device can be embodied or can comprise a mobile computing device having rich wireless upstream connectivity. To implement the disclosed controlled consumption of content in the device (or a first computing device), in one aspect, the control device (or second computing device) that is remote from the end-point device and has upstream connectivity with a service provider network associated with the device can leverage information management and/or control functionality of such network to acquire information related to content assets (linear programming, non-linear programming, management assets, such as control functions, etc.) made available for consumption by the service provider. In one implementation, the control device can initiate consumption of content via a first communication pathway (e.g., a line-of-sight wireless path), and can broker exchange of tuning information between the one-way device and the content distribution network node (e.g., a distribution device, a distribution server, or a QAM node) via the first communication pathway and a second communication pathway (e.g., a macro-cellular wireless communication path). Such exchange can permit delivery and/or control of content (e.g., pay-per-view (PPV) content assets, video-on-demand (VOD) content assets, networked digital video recording (nDVR) content assets) through the one-way device in a manner that is subscriber agnostic with respect to the subscriber associated with the one-way device.

Some embodiments of the disclosure can provide several advantages over conventional technologies for consumption of content assets via a control device. One example advantage includes broadening the scope of digital services accessed through a low-complexity low-cost CPE or any user device by exploiting functionality of a computing device with rich upstream connectivity to leverage data management and control functionality of the network that generally can be accessed via CPE having more complex functionality. Another example advantage includes permitting a more fulfilling interactive user experience with increased quality of service. Affording rich digital services to such equipment can provide additional revenue opportunities for a network operator. Yet another example advantage includes providing ubiquitous rendering of content in a one-way end-point device regardless of whether such device is associated with a subscriber of the content being rendered. Such ubiquitous rendering can provide "portable time-shifted content" among end-users subscribed to a content service of a service provider in that a first subscriber can consume time-shifted content (e.g., nDVR and/or VOD) in a rendering device of a second subscriber.

Additional aspects or advantages of the disclosure will be set forth in part in the description which follows, and in part will be readily apparent from the description, or may be learned by practice of the subject disclosure. The advantages of the disclosure can be realized and attained by means of the elements and combinations particularly pointed out in the appended claims. It is to be understood that both the foregoing general description and the following detailed description are illustrative and explanatory only and are not restrictive of the subject disclosure.

BRIEF DESCRIPTION OF THE DRAWINGS

The annexed drawings are an integral part of the disclosure and illustrate example embodiments thereof. Together with the description set forth herein and claims appended hereto the annexed drawings serve to explain various principles, features, or aspects of the disclosure.

DETAILED DESCRIPTION

Figure 1:
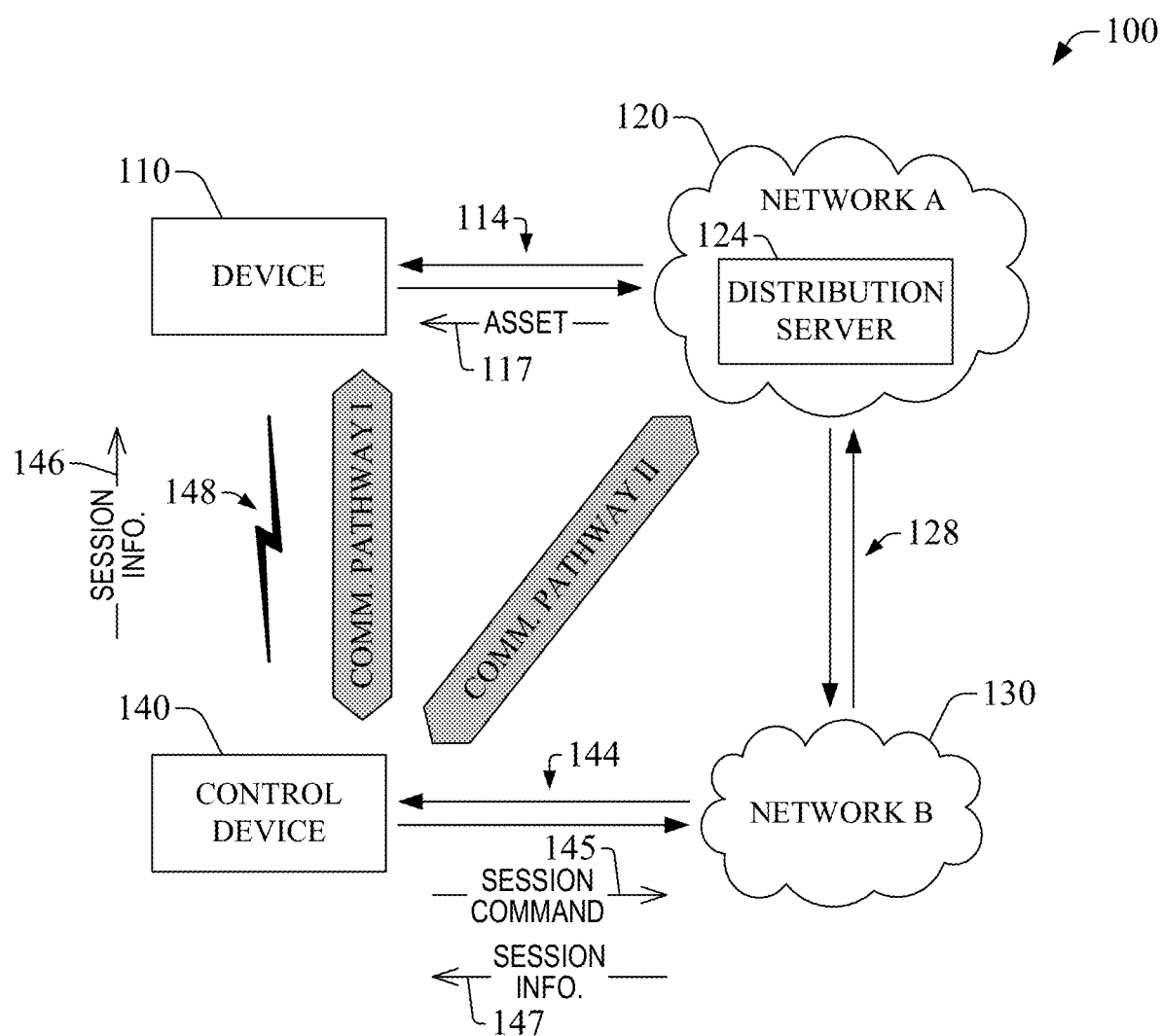
FIGS. 1-2 illustrate example network environments in accordance with one or more aspects of the disclosure.

The various aspects described herein can be understood more readily by reference to the following detailed description of example embodiments of the subject disclosure and to the annexed drawings and their previous and following description.

Before the present systems, articles, apparatuses, and methods are disclosed and described, it is to be understood that the disclosure is not limited to specific systems, articles, apparatuses, and methods for content consumption in a downstream-only device, in which the consumption is controlled by a two-way device having upstream and downstream connectivity. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function," "device," "controller" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function," "device," "controller" can be utilized interchangeably.

Throughout the description and claims of this specification, the words "comprise," "include," and "have" and their variations, such as "comprising" and "comprises," "including" and "includes," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiment(s) and related aspects of the subject disclosure, example(s) of which are illustrated in the accompanying drawings. Wherever possible, the same reference numbers are used throughout the drawings to refer to the same or like parts.

As described in greater detail below, the disclosure relates, in one aspect, to control of consumption of content in a device, such as an end-point rendering device. The content can include linear-programming content assets and/or time-shifted content assets. The consumption can be mediated by a control device that can coordinate the functional interaction between the device and a content distribution network node or an access network node that can supply the content and related tuning information.

Referring to the drawings, FIG. 1 illustrates a high-level block diagram of an example network environment in which consumption of content can be implemented in accordance with one or more aspects of the disclosure. The example network environment 100 comprises a device 110 that is functionally coupled (e.g., communicatively coupled) to a network A 120 which can include wireless networks, wireline networks, and any combination thereof. In certain embodiments, the device 110 can be contained or can be embodied in a CPE. In additional or alternative embodiments, the device 110 can comprise or can be embodied in a user device (mobile or pseudo-stationary). While in the illustrated embodiment the device 110 is coupled to the network A 120 via the link 114, in additional embodiments, the device 110 can be coupled to the network A 120 via an additional network, such as a home network (not depicted). In one aspect, network B 130 can be administered (e.g., owned, operated, and/or leased) by a network operator that provides services such as digital television content; internet protocol (IP) video content; digital telephony; data services, such as wide-area network services (e.g., internet service) or home network services (e.g., Wi-Fi access, femtocell access), and the like. A data and signaling pipe 114 comprising a downstream link, or downlink (DL), enables functional coupling between the device 110 and the network A 120. The data and signaling pipe 114 can comprise a wireless link or wireline link, or a combination thereof. As described herein, the device 110 can be embodied in or can comprise almost any computing device, such as customer premises equipment, including an electronic device that is part of a network (e.g., a communication network, a home network, a utilities network, or combinations thereof) and can have various levels of computational capability. In certain embodiments, the electronic device can be an end-point display device, without computing functionality, that can render previously decoded signals. For example, the device 110 can be embodied in at least one of a terminal display device, a digital terminal adapter (DTA), a set top box (STB), an IP-enabled television, a personal computer, and so forth. In one embodiment, the device 110 can be a one-way (e.g., downstream-only) device that cannot transmit upstream communications to the network A 120. It should be appreciated that in such embodiment, the device 110 may not transmit information upstream (e.g., from the device 110 to the network A 120) due to operational condition(s), such as connectivity issue(s)).

As illustrated, network A 120 can comprise a distribution server 124 (e.g., a session resource manager (SRM) server) that can be contained in a distribution platform (e.g., a local headend or hub) and can be functionally coupled to a network B 130 via a data and signaling pipe 128. The distribution server 124 can manage ingestion of content from one or more sources of content and/or delivery of at least a portion of such content to the device 110. In one implementation, as described herein, such delivery can be based on broadcast or narrowcast of QAM transport streams. In another implementation, the delivery can be based on transmission of a packet-switching (PS) communication protocol information stream. As an illustration, the packet-switching communication protocol can include Ethernet protocol; internet protocol (IP), such as IPv4 and IPv6, or the like; or user datagram protocol (UDP). In addition or in the alternative, the distribution server 124 can deliver signaling and/or control information (such as tuning information) to the control device 140 via the network B 130. It should be appreciated that while the disclosure is illustrated in reference to the distribution server 124, any or substantially any distribution network node or an access network node with the functionality of such server is contemplated in the present disclosure.

Network B 130 can include wireless networks, wireline networks, and any combination thereof. The data and signaling pipe 128 can comprise one or more of a reference link, and related components; a conventional bus architecture, such as address bus(es), power bus(es), or system bus(es); a conventional wireline link, such as an Ethernet line, a T-carrier line, a twisted-pair line, or the like; a wireless link, including terrestrial wireless links or satellite-based links, or a combination thereof; and so forth.

Network A 120 and network B 130 can include one or more of wide area networks (WANs), one or more local area networks (LANs), signaling networks (e.g., SS #7), and so forth. Such networks can operate in accordance with any communication protocol, such as protocols for wireline communication or wireless communication. In one aspect, the network A 120 can have internal structure, with various functional elements that can provide at least two main operational blocks: a backbone network (e.g., a high-capacity packet-switched network) and a regional access network (RAN). Both the backbone network and the regional access network (RAN) can be WANs, for example, with the backbone network having a larger geographical scope than the RAN. Similarly, the network B 130 can have internal structure, with several functional elements that can provide various operational blocks, such as a backbone network (e.g., a high-capacity packet-switched network), a core network platform, a radio access network, and so forth. It should be appreciated that, in one aspect, the networks A 120 and B 130 can include one or more middleware components that, at least partly in conjunction with data and signaling pipe 128, permit the functional coupling between such networks, among other functions.

In the example network environment 100, the control device 140 can control consumption of content (linear programming, non-linear programming, time-shifted content assets, etc.) at the device 110. The content is represented as asset 117. To at least such end, in one aspect, the control device 140 can leverage two types of upstream connectivity to mediate exchange of information between the distribution server 124 and the device 110: (1) point-to-point connectivity, such as short-range optically-switched communication (either switched in the visible spectrum or in the infrared (IR) spectrum, for example); and (2) wireless WAN-based upstream connectivity, such as macro-cellular communication (e.g., 3GPP Long Term Evolution Network communication, 4G network communication, etc.). In one aspect, the first upstream connectivity can establish a first communication pathway—labeled as "communication pathway I"—from the control device 140 to the device 110. In one additional aspect, the second upstream connectivity can establish a second communication pathway-labeled as "communication pathway II"—from the control device 140 to the distribution server 124. For point-to-point (P2P) connectivity, the control device 140 can utilize most any radio technology for line-of-sight (LOS) telecommunication, such as optically-switched telecommunication. It should be appreciated, in one aspect, that P2P connectivity can provide presence information associated with the subscriber operating the control device 140. In certain implementations, the network A 120 can utilize such presence information to leverage location-based services to the control device 140. For the wireless WAN-based upstream connectivity, the control device 140 can utilize one or more of several PS switching protocols (e.g., simple network management protocol (SNMP), TCP/IP, and the like) supported by one or more of such networks. In certain embodiments, e.g., embodiment 300 in FIG. 3, the control device 140 can comprise a radio unit 324 that can permit communication of information (e.g., data, metadata, and/or signaling) via communication pathway I and communication pathway II.

In scenarios in which control device 140 is intended to control consumption of a transport stream conveying a non-linear content asset, such transport stream can generally be transmitted in a specific service group, e.g., a portion of downstream spectrum comprising one or more narrowcast channels, associated with the device 110. In one aspect, the control device 140 can transmit a session initiation command, e.g., embodying session command 145, to the distribution server 124 and in response, the control device 140 can receive tuning information indicative of the specific service group (e.g., a plurality of downstream channels) utilized by the device 110 to convey content. The session initiation command can be transmitted via the network 130. The tuning information is one embodiment of session information (info.) 147 and can include payload data representative of a non-motion picture for initialization of a service for consumption of time-shifted asset. In one aspect, the control device 140 can transmit the tuning information to the device 110 via the LOS link 148 that is included in communication pathway I. The tuning information that is transmitted can embody session information 146.

In response to receiving the tuning information, in one implementation, the device 110 can tune to a frequency channel associated with the specific service group, and can render the non-motion picture contained in the tuning information. In addition, the device 110 can render an identifier representative of at least service group of the device 110 and rendering capability (e.g., standard definition (SD), high definition (HD), H.264 format, etc.) of the device 110. In one embodiment, the control device 140 can ingest the identifier—e.g., the control device 140 can receive data indicative of the identifier via an I/O interface, which can be integrated into or functionally coupled to the rendering unit 332 in the example embodiment 300 shown in FIG. 3—and can compare the type of the non-linear asset intended for consumption with the rendering functionality of the device 110. In one embodiment of the control device 140, e.g., embodiment 300 shown in FIG. 3, an asset consumption driver unit 328 (referred to as asset consumption driver 328) can perform the comparison of the type of the non-linear asset and the rendering functionality. In one aspect, a data structure indicative of the rendering functionality can be retained in memory element 336, referred to as data storage 336, whereas the type of the non-linear asset can be retained in a record in the one or more memory elements 335, referred to as asset consumption information (info.) 335. In a scenario in which such rendering functionality can permit rendering the non-linear asset at the device 110, the control device 140 can transmit a delivery command to the distribution server 124. The delivery command can embody or can be contained in the session command 145. In example embodiment 300, the delivery command can be generated by the asset consumption driver 328 and supplied to the radio unit 324 for transmission to the distribution server 124 via the communication pathway II. In such embodiment, the asset consumption driver 328 can exchange information with the radio unit 324 via a bus 327.

In one aspect, the distribution server 124 can transmit, to the control device 140, tuning information for consumption of the non-linear content asset (e.g., a time-shifted content asset, such as a VOD asset or an nDVR asset) in response to receiving the delivery command. Such tuning information can comprise a channel frequency, a program identifier (e.g., PID or program number), and/or a transport stream identifier (TSID) for the non-linear content asset. It should be appreciated that, in one aspect, PID and TSID are specific to scenarios in which an information stream is encoded according to moving picture experts group (MPEG) format. It is contemplated that in scenarios in which the information stream encoded according to a format other than MPEG, the tuning information can include the channel frequency and/or one or more content identifiers specific to the content(s) conveyed in the information stream. In turn, the control device 140 can relay such tuning information to the device 110. The tuning information can embody or can be contained in the session information 146.

In response to receiving the tuning information associated with the non-linear asset, in one aspect, the device 110 can tune to the frequency channel conveyed by the tuning information and can compare the received TSID with a current TSID associated with a current delivery of the non-motion picture previously received at the device 110. It should be appreciated that, in one aspect, such comparison can be performed to prevent cross-stream processing of content frames. When the outcome of the comparison indicates that the received TSID and the current TSID are consistent, the device 110 can render the non-linear asset.

In one scenario, a command for consumption of an asset (e.g., a session command 145) can include an instruction to control an information stream associated with media content being consumed at the device 110. The instruction can be at least one of a first instruction to advance the media content associated with the data stream, a second instruction to rewind the media content associated with the data stream, and a third instruction to terminate rendering, at the device 110, the media content associated with the information stream. In such scenario, the control device 140 also can coordinate implementation of such instruction(s) by leveraging communication pathway I and communication pathway II.

Figure 2:
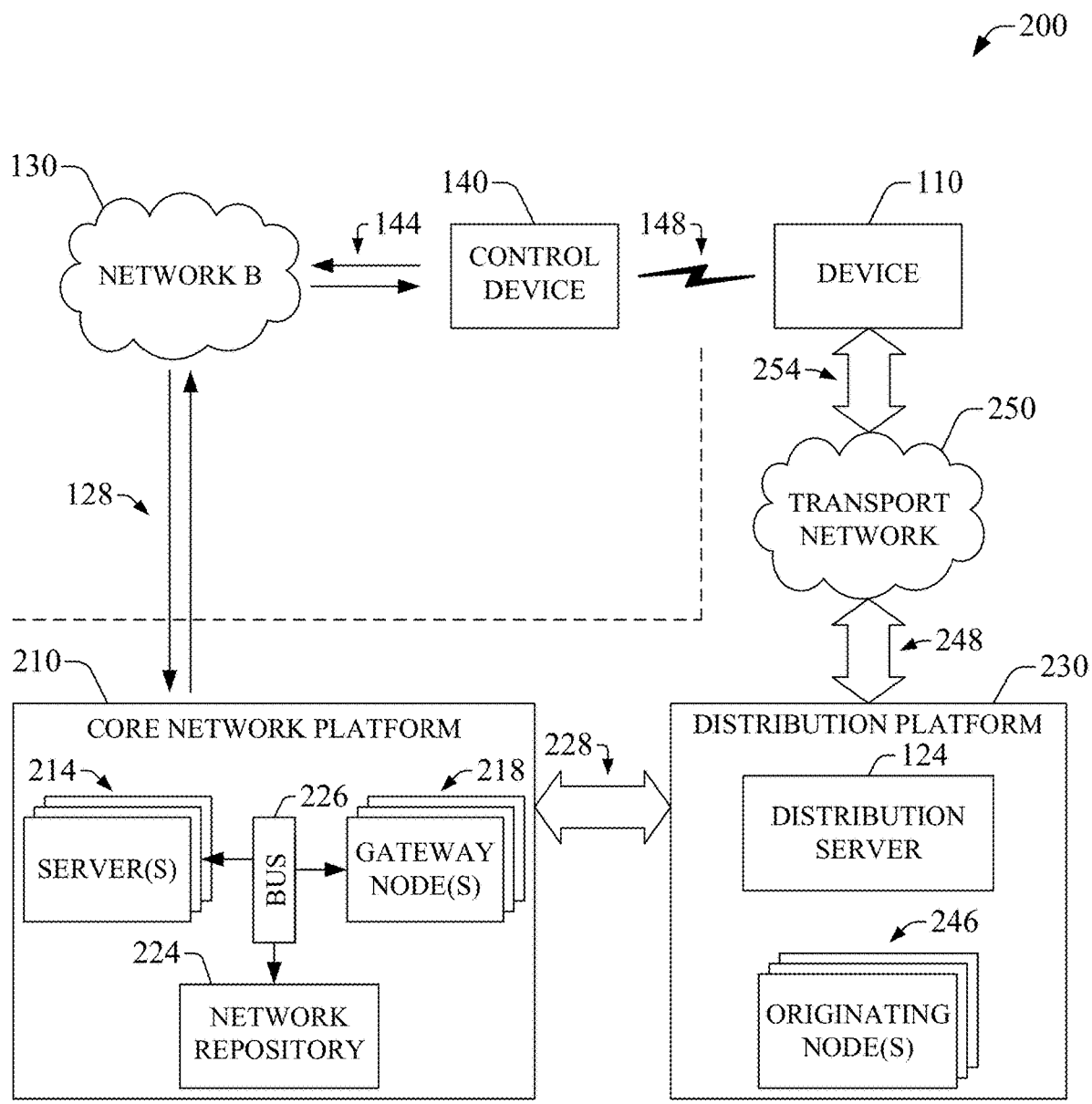

FIG. 2 is a high-level block diagram of an example embodiment 200 of the network environment 100 in accordance with one or more aspects of the disclosure. As illustrated, such network environment can comprise network B 130 and various network elements that embody the network A 120. To more clearly identify various aspects of the example embodiment 200, the boundaries of the network A 120 are depicted with dashed lines in FIG. 2. As illustrated, such network elements comprise a core network platform 210 functionally coupled to a distribution platform 230 through a data and signaling pipe 228. Core network platform 210 can have a packet-switched (PS) architecture and can serve as a border architecture that permits functional coupling to the network B 130. The core network platform 210 can include various network nodes which can be distinguished according to the functionality thereof. As illustrated, the various network nodes can comprise one or more server(s) 214, one or more gateway node(s) 218, and a network repository 224. While illustrated as a single entity, the network repository 224 can be distributed in order to provide data resiliency and other data management advantages. In addition, while core network platform 210 is illustrated as a single block, in one or more embodiments such platform can be distributed, having a centralized deployment site and a plurality of distributed deployment sites. Functionality and architecture of the one or more servers 214, the one or more gateway nodes 218, and the network repository 224 can be specific, yet not exclusive, to the particular embodiment of the core network platform 210. For instance, in an example embodiment in which the core network is an Internet protocol (IP) multimedia subsystem (IMS) network, network repository 224 can be a home subscriber server (HSS); server(s) 214 can comprise application server(s), and specific function control nodes (e.g., Call Session Control Functions (CSCFs), such as serving CSCF (S-CSCF) and interrogating CSCF (I-CSCF)) and proxy servers; and gateway node(s) 218 can comprise a breakout gateway control function (BGCF), a media gateway (MGW) and a signaling gateway (SGW), and media gateway control function (MGCF).

Network nodes, or network elements, in the core network platform 210 can be functionally coupled through a bus 226, which permits exchange of information (e.g., data, metadata, or signaling, or a combination thereof) between two or more of server(s) 214, gateway node(s) 218, and network repository 224. In one embodiment, bus 226 can include a plurality of reference links (Cx, Cr, Dh, Dx, Gm, Ma, Mg, etc.), and related components, and conventional bus architectures, such as address buses, system buses, power buses, and the like.

Distribution platform 230 can comprise one or more signal processing component(s) (which can be integrated into the distribution server 124, for example) that can receive and operate on an information stream, such as a data stream, a signaling stream, or a combination thereof. In one aspect, such component(s) can perform one or more operations on the information stream, such as encoding, modulation, multiplexing, up-conversion, combination, or the like. Architecture of the distribution platform 230 can be specific to the implemented modality utilized for transmission of the information stream. Such modality can include wired delivery or wireless delivery, and specific protocols for transmission of information, such as packet-switched communication, circuit-switched communication, or the like. In one embodiment, at least one of such signal processing component(s) can embody a termination system (TS), such as, in one type of network, a cable modem termination system (CMTS). In another embodiment, at least one of the one or more signal processing components of distribution platform 230 can embody a network router or a network switch (e.g., a digital subscriber line access multiplexer (DSLAM)) for transmission of information streams based on a PS communication protocol, such as internet protocol (IP) (e.g., IPv4 or IPv6). As illustrated, the distribution platform 230 can comprise a group of one or more originating nodes 246 that can transmit the information stream. In certain embodiments, each originating node of the group of one or more originating node(s) 246 can embody an edge quadrature amplitude modulation (QAM) node. In other embodiments, each one of the group of one or more originating nodes 246 can comprise or can embody a device that can consolidate the functionality of a termination system (e.g., a CMTS) and an edge QAM node. In other embodiments, each originating node of the group of one or more originating node(s) 246 can embody a network router (e.g., a broadband remote access server (BRAS)) or network switch (e.g., a DSLAM) for transmission of information streams based on a PS communication protocol (e.g., IP, comprising IPv4 and/or IPv6). While illustrated as a single block, in certain embodiments, the distribution platform 230 can be distributed, having a centralized deployment site (or plant) and a plurality of hub sites (also referred to as sites). In such embodiments, each one of the hub sites can comprise an edge originating node of the group of one or more edge originating node(s) 246.

Distribution platform 230 can receive data (e.g., data flows, audio signals, video signals, any combinations thereof, etc.), metadata (which can characterize at least a portion of the data), and signaling (control instructions, clock signals, etc.) from a functional element that is, for example, part of the core network platform 210 or that is functionally coupled thereto. In one scenario, the functional element can be a server that supplies a combination of audio signals and video signals, such as an audiovisual signal comprising a video asset. The server can be, for example, a content server for pay-per-view programming, VOD content assets, or nDVR content assets; an application server; a data server; a telephony server; a backbone network router; or the like. In such scenario, based on the formatting of the audiovisual signal, one or more signal processing component(s) (e.g., distribution server 124) in the distribution platform 230 can process (e.g., encode, encrypt, modulate, multiplex, up-convert, and/or combine) the audiovisual signal and supply a resulting audiovisual signal to an edge originating node of the group of one or more originating nodes 246. In one aspect, an originating node can transmit a plurality of P (a natural number) data streams, conveying at least a portion of the audiovisual signal. It should be appreciated that, in certain embodiments, the edge originating node can operate on the audiovisual signal without reliance on such one or more signal processing component(s). In another scenario, a source node (e.g., a satellite transceiver coupled to an asset source; not shown) functionally coupled to the distribution platform 230 can generate an audiovisual signal, which can be processed by the one or more processing component(s) and supplied to an edge originating node of the one or more originating nodes 246. Such edge originating node can transmit a plurality of P data streams conveying at least a portion of the audiovisual signal.

A gateway node of the one or more gateway node(s) 218 can receive the session command 145 and relay it to the distributed server 124 that can be contained in the distribution platform 230. In another implementation, a server (e.g., a proxy server) of the one or more servers 214 can receive the session command 145 and relay it to the asset control unit 238. As described herein, the session command 145 can be a message that initiates a session for consumption of a content asset (e.g., a time-shifted media asset). In one aspect, the session command 145 can comprise a data structure suitable for initiating consumption (e.g., delivery) of the content asset. In another aspect, the session command 145 can comprise or can embody a control message (or control command) comprising an instruction to control consumption of a content asset, wherein the instruction can be at least one of a first instruction to advance rendering of content asset (e.g., a fast-forward command); a second instruction to retreat the rendering of content asset (e.g., a rewind command) related to the data stream; or a third instruction to suspend or terminate rendering the content asset (e.g., a pause command or a stop command). In response to receiving a control command, the distribution server 124 can supply control data to the control device 140. In one aspect, the control device 140 can decode at least a portion of the control data; and, in response to the decoding, can render a representation, e.g., indicia, such as a progress bar indicative of the decoded control data. For example, the representation can indicate status of execution (e.g., fast-forward progress) of the control command (e.g., fast-forward instruction).

In one aspect, the distribution server 124 contained in the distribution platform 230 can discover a service group, and related tuning information, associated with the device 110. In certain implementations, the distribution server 124 can include an asset control unit (not shown) that can transmit signaling indicative of a suitable asset format and delivery route for a non-linear asset to an asset source unit (not shown) in the distribution platform 230, wherein the asset source unit can provision and deliver the non-linear asset in such format and delivery route. As an example, in a scenario in which the device 110 is a digital terminal adaptor, the distribution server 124 can establish that delivery of a time-shifted content asset is to be effected through a first delivery route comprising an originating node (e.g., an edge QAM), whereas in a scenario in which the device 110 is a computing device with suitable resources, the distribution server 124 can determine that delivery of the time-shifted content asset is to be effected through a second delivery route comprising an originating node that can be a termination system, such as a cable modem termination system. Other implementations are contemplated in which the first delivery route can comprise a first network router or network switch for PS communication, and the second delivery route can comprise a second network router or network switch for PS communication. The first delivery route and the second delivery route both include data and signaling pipe 248, various functional elements of transport network 250 (e.g., an HFC network, a broadband network such as a digital subscriber line (DSL) network, or the like) and data and signaling pipe 254.

The transport network 250 can be a WAN that can be embodied in a wireless network, a wireline network, or a combination thereof, and can supply data service(s), such as television programming, video-on-demand programming, Internet service, and/or packet-switched data or telephony, to a user location which can be stationary (e.g., a location of a CPE) or mobile (e.g., a location of a mobile device). In certain implementations, transport network 250 can be embodied in an optic fiber network, a coaxial cable network, a hybrid fiber coaxial (HFC) network, or a wireless network comprising terrestrial wireless links and deep-space links (e.g., satellite links), or any combination thereof. As an illustration, in an embodiment in which the transport network 250 is an HFC network, data and signaling pipe 248 can comprise several optic fiber links and associated optical functional elements, such as downstream lasers, light amplifiers, last-mile fiber aggregator nodes, and the like. In addition, in such embodiment, transport network 250 can comprise various RF amplifiers and coaxial taps to respective dwellings (e.g., a stationary user location) wherein customer premises equipment (CPE), such as device 110, can consume a data service provided through distribution platform 230. In such embodiment, the CPE can be functionally coupled to a cable modem (not shown) and/or other device (e.g., a DTA) that can serve as the network gateway to the dwelling network (e.g., a home area network) from the transport network 250. As another illustration, in an embodiment in which the transport network 250 is a wired broadband PS network, data and signaling pipe 248 can comprise Ethernet links, and can include network routers such as BRASs and network switches, such as DSLAMs. The network switches can be functionally coupled to home gateways (e.g., DSL modems) in dwellings in which CPE (e.g., device 110) can consume data services provided through distribution platform 230.

Figure 3:
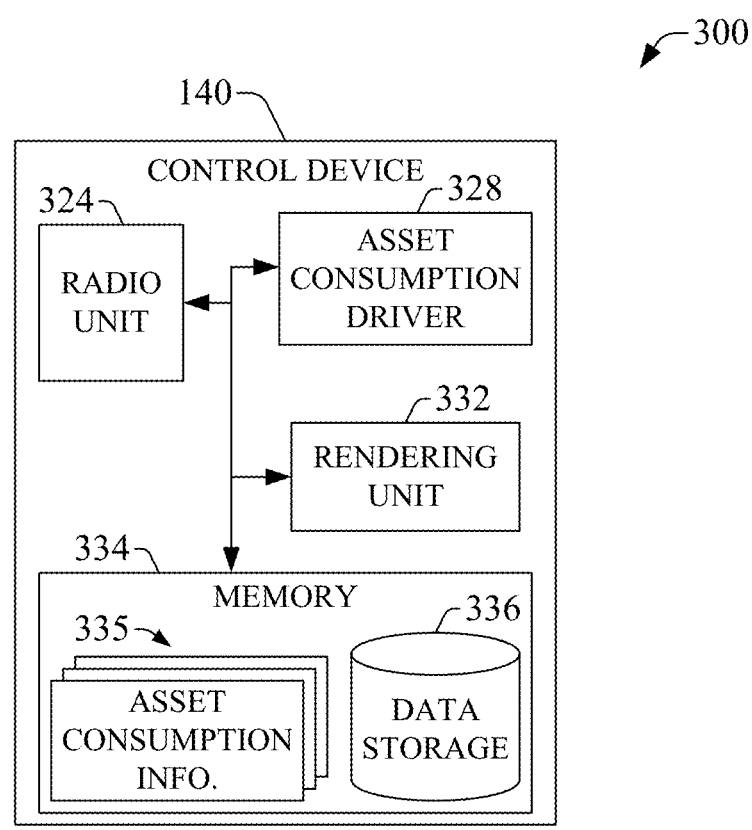
FIG. 3 illustrates an example embodiment of a computing device in accordance with one or more aspects of the disclosure.

As described herein, FIG. 3 is a block diagram of an example embodiment 300 of the control device 140 in accordance with one or more aspects of the disclosure. As illustrated, the control device 140 can comprise a memory 334 having computer-executable instructions encoded thereon. Such instructions can be retained within the memory 334, for example, within the memory element 335. In addition, the control device 140 also can comprise a radio unit 324, an asset consumption driver 328, and a rendering unit 332 that can be functionally coupled to the memory 334. In one aspect, the radio unit 324 can transmit an initiation command to initiate consumption of a media asset to a distribution server through a first communication pathway. In response to the initiation command, the asset consumption driver 328 can determine if the media asset is suitable to be consumed through the device 110, which can be configured to consume a plurality of media assets. Based on the outcome of such determination, the radio unit 324 can transmit a delivery command to proceed with the consumption of the media asset to the distribution server in response to the media asset being suitable to be consumed through the device 110. In one aspect, the delivery command can comprise an identifier indicative of a plurality of downstream channels (e.g., a service group). The identifier indicative of such channels can be retained in the memory element 335 (labeled as asset consumption information). In addition, the radio unit 324 can to receive first tuning information in response to the delivery command. In one aspect, the first tuning information comprising data indicative of a first downstream channel of the plurality of downstream channels. In another aspect, the radio unit 324 can transmit the first tuning information to the device through a second communication pathway.

In one aspect, the asset consumption driver 328 can receive information including data indicative of an information stream conveying the media asset, and data indicative of a first transport stream identifier (TSID) associated with the information stream. In another aspect, the asset consumption driver 328 can receive second tuning information from the distribution server in response to the initiation command, and can relay such information to the device 110.

The asset consumption driver 328 also can to control consumption of the media asset by transmitting a control command to the distribution server, receiving control data from the distribution server in response to the control command, and transmitting, via the radio unit 324, a portion of the control data to the device 110 through the second communication pathway.

Figure 4A:
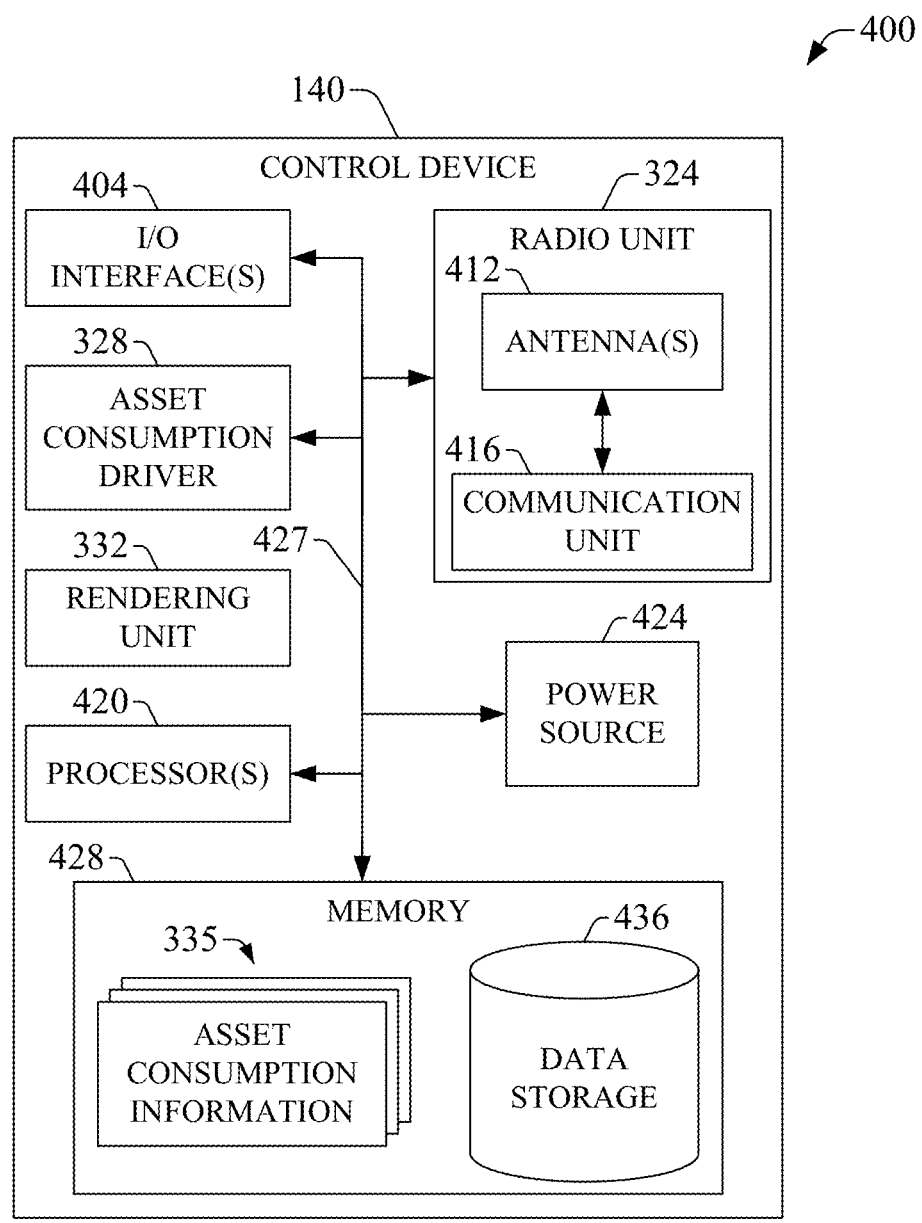
FIGS. 4A-4C illustrate example embodiments of a computing device in accordance with one or more aspects of the disclosure.
Figure 4B:
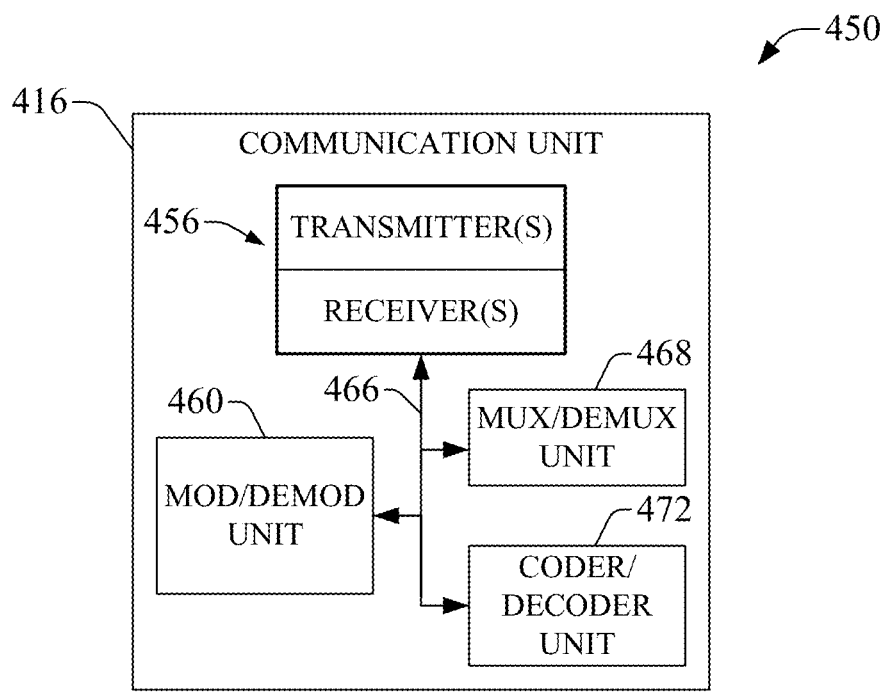

FIG. 4A illustrates an example embodiment 400 of the control device 140 in accordance with one or more aspects of the disclosure. In one aspect, the control device 140 can embody a handheld wireless communication device (e.g., a smartphone). To permit wireless communication with a device (e.g., device 110) and provide information for consumption of time-shifted content in accordance with one or more aspects described herein, the control device 140 includes a radio unit 324 having one or more antennas 412 and a communication unit 416. As illustrated in exemplary embodiment 450 shown in FIG. 4B, the communication unit 416 can comprise a set of one or more transmitters/receivers 456, and components therein (amplifiers, filters, etc.) functionally coupled to a modulator/demodulator (mod/demod) unit 460 (also referred to as modem 460), a multiplexer/demultiplexer (mux/demux) unit 468, and a coder/decoder unit 472 (also referred to as codec 472). Each transmitter and each receiver of the transmitter(s)/receiver(s) 456 can transmit and receive, respectively, wireless signal via the one or more antennas 412. In addition, in one embodiment, at least one of the transmitters in the transmitter(s)/receiver(s) 456 can transmit wireless signals upstream (e.g., from the control device 140 to a destination device) via an optical communication interface (e.g., an infrared (IR) light emitting diode (LED) and associated circuitry) that can be part of the one or more I/O interfaces 404. The optical communication interface can be energized by the power source 424. In certain embodiments, the optical interface can be removable and can be coupled to the control device 140, via another I/O interface, such as an earphone (or headphone) jack. In one aspect, the communication unit 416, via the modem 460, can process received signals or signals to be transmitted via an antenna or the optical interface of the one or more interfaces 404.

Electronic components and associated circuitry, such as mux/demux unit 468, modem 460, and codec 472, can permit processing, e.g., coding/decoding, deciphering, modulation/demodulation, and the like, of signal(s) received by the control device 140 and signal(s) to be transmitted by the control device 140. In one aspect, received and/or transmitted wireless signal(s) can be modulated and coded, or otherwise processed, in accordance with one or more radio technology protocols (e.g., 3rd Generation Partnership Project (3GPP) Universal Mobile Telecommunication System (UMTS), 3GPP Long Term Evolution (LTE), or the like).

The electronic components in the communication unit 416, including the one or more transmitters/receivers 456, can exchange information (e.g., data, metadata, code instructions, signaling and related payload data, combinations thereof, or the like) through a bus 466, which can embody or comprise at least one of a system bus, and address bus, a data bus, a message bus, a power bus, or a reference link or interface. Each of the one or more receivers/transmitters 456 can convert signals from analog to digital and vice versa. In addition or in the alternative, receiver(s)/transmitter(s) 456 can divide a single data stream into multiple parallel data streams, or perform the reciprocal operation. Such operations may be conducted as part of various multiplexing schemes. As illustrated, the mux/demux unit 468 is functionally coupled to the one or more receivers/transmitters 456 and can permit processing of signal(s) in time and frequency domain. In one aspect, the mux/demux component 468 can multiplex and demultiplex information (e.g., data, metadata, signaling, or both) according to various multiplexing schemes, such as time division multiplexing (TDM), frequency division multiplexing (FDM), orthogonal frequency division multiplexing (OFDM), code division multiplexing (CDM), or space division multiplexing (SDM). In addition or in the alternative, in another aspect, the mux/demux component 468 can scramble and spread information (e.g., codes) according to substantially any code; e.g., Hadamard-Walsh codes, Baker codes, Kasami codes, polyphase codes, and so on. The modem 460 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) 420 can permit, at least in part, the control device 140 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

The codec 472 can operate on information (e.g., data, signaling, or both) in accordance with one or more coding/decoding schemes suitable for communication, at least in part, through the one or more transmitters/receivers 456. In one aspect, the coding/decoding schemes, or related procedures, can be retained as a group of one or more code instructions in memory 428. In a scenario in which wireless communication among the control device 124 and a base station (e.g., macro-cellular base station) of the network B 130 utilizes multiple-input multiple-output (MIMO), multiple-input single-output (MISO), single-input multiple-output (SIMO) or single-input single-output (SISO) operation, the codec 472 can implement at least one of space-time block coding (STBC) and associated decoding; or space-frequency block (SFBC) coding and associated decoding. In addition or in the alternative, the codec 472 can extract information from data streams coded in accordance with spatial multiplexing scheme. In one aspect, to decode received information (data, metadata, signaling, or a combination thereof), the codec 472 can implement at least one of: computation of log-likelihood ratios (LLR) associated with constellation realization for a specific demodulation, maximal ratio combining (MRC) filtering, maximum-likelihood (ML) detection, successive interference cancellation (SIC) detection, zero forcing (ZF) and minimum mean square error estimation (MMSE) detection, or the like. The codec 472 can employ, at least in part, mux/demux component 468 and mod/demod component 460 to operate in accordance with aspects described herein.

As described herein, the control device 124 can operate in a variety of wireless environments having wireless signals conveyed in different electromagnetic radiation (EM) frequency bands. To at least such end, in one aspect, the communication unit 416 can process (code, decode, format, etc.) wireless signal(s) within a set of one or more EM frequency bands (also referred to as frequency bands) comprising one or more radio frequency (RF) portions of the EM spectrum, microwave portion(s) of the EM spectrum, or infrared (IR) portion of the EM spectrum. In one aspect, the set of one or more frequency bands can include at least one of (i) all or most licensed EM frequency bands, or (ii) all or most unlicensed frequency bands currently available for telecommunication.

The control device 140 can include a memory 428 and one or more processors 420 functionally coupled thereto. In one aspect, the functional coupling is provided via a bus 427. In certain implementations, data storage 428 can be retained in a removable element, such as a subscriber identification module (SIM) card storage, a universal integrated circuit card (UICC) storage, or a removable user identity module (RUIM). In one aspect, the memory 428 can retain the asset consumption information 335.

Figure 4C:
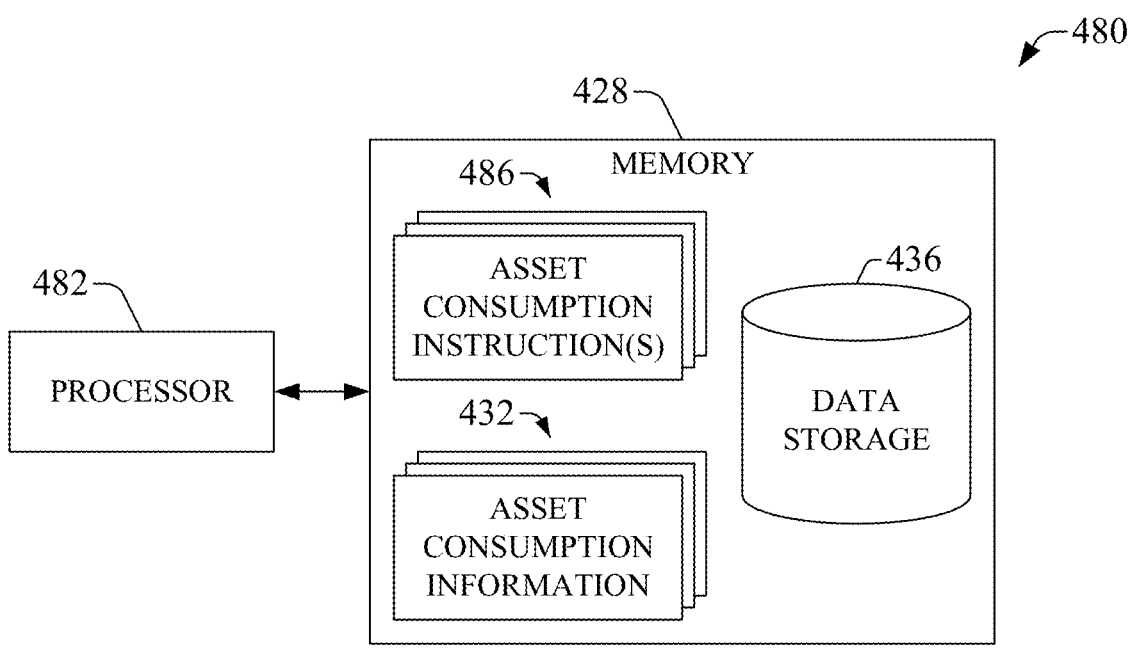

In one embodiment, such as example embodiment 480 presented in FIG. 4C, the memory 428 can comprise a memory element 486 having one or more computer-accessible instructions encoded thereon (the memory element 486 is represented with a block labeled asset consumption instruction(s)). Such instruction(s) can configure a processor 482 to perform various functions, where the processor 482 is one of the processor(s) 420. In one aspect, the computer-executable instructions, or a portion thereof, can configure the processor 482 to transmit an initiation command to initiate consumption of a media asset to a distribution server (e.g., distribution server 124) through a first communication pathway (e.g., comm. pathway II). In another aspect, the computer-executable instructions, or a portion thereof, can configure the processor 482 to determine, in response to the initiation command, if the media asset is suitable to be consumed through a device (e.g., device 110) configured to consume a plurality of media assets. In another aspect, the computer-executable instructions, or a portion thereof, can configure the processor 482 to transmit a delivery command (which can embody a session command 145, for example) to proceed with the consumption of the media asset to the distribution server in response to the media asset being suitable to be consumed through the device, the delivery command comprising an identifier indicative of a plurality of downstream channels (e.g., a service group in a content distribution network). It should be appreciated, that in one aspect, proceeding with consumption of the media asset can comprise delivering content from the distribution server to the device.

In yet another aspect, the computer-executable instructions, or a portion thereof, can configure the processor 482 to receive first tuning information in response to the delivery command, the first tuning information comprising data indicative of a first downstream channel of the plurality of downstream channels. The first tuning information can be received from the distribution server via a first communication pathway. In still another aspect, the computer-executable instructions, or a portion thereof, can configure the processor 482 to transmit the first tuning information to the device through a second communication pathway (e.g., comm. pathway I).

In still another aspect, the processor 482 can be configured to receive second tuning information from the distribution server in response to the initiation command. Such tuning information can be processed by the processor 482 in order to mediate consumption of the media asset at the device 110. In one implementation, the processor 482 can be configured, by the computer-executable instructions, or a portion thereof, to transmit the second tuning information to the device through the second communication pathway; to receive, in response to the transmission, an identifier conveying one or more of data indicative of a second downstream channel and data indicative of rendering capability of the device (e.g., standard-definition (SD) rendering, high-definition (HD) rendering); and to compare a type of the media asset (e.g., SD asset, HD asset, etc.) with the rendering capability. Such information collection and comparison can embody an integrity check and, in response to agreement between the rendering capability and the media asset type, can permit a subscriber of content distribution service associated with the control device 140 to consume content through a device 110 that is not associated with an account of the subscriber.

In one implementation, the processor is further configured, by the computer-executable instructions, or a portion thereof, to receive information comprising data indicative of an information stream (e.g., a single program transport stream) conveying the media asset, wherein the data indicative of a first transport stream identifier (TSID) is associated with the information stream.

In another implementation, the processor can be configured, by the computer-executable instructions, or a portion thereof, to control consumption of the media asset, by the computing device, by transmitting a control command to the distribution server; to receive, at the computing device, control data from the distribution server in response to the control command; and to transmit a portion of the control data to the device through the second communication pathway.

As illustrated, the control device 140 comprises one or more processors 420 which can permit, at least in part, functionality of one or more functional elements of the control device 140 in accordance with one or more aspects described herein. The one or more processors 420 can be functionally coupled to each functional element within the control device 140 and to the memory 428 via bus 427. In certain implementations, the bus 427 can be embodied in one or more of: a memory bus, a system bus, an address bus, a message bus, a power bus, or one or more reference links or interface(s). While in embodiment 400, the one or more processors 420 are illustrated as external to the various functional elements (e.g., component(s), interface(s), platform(s), node(s)) of the control device 140, in an additional or an alternative embodiment, the one or more processors 420 can be distributed among a plurality of such functional elements. In certain embodiments, one or more functional elements of the control unit 140 can reside within the memory 428 as one or more sets of computer-accessible instructions, e.g., computer-readable computer-executable instructions. Such instructions, in response to execution by a processor of the one or more processors 420, can implement the functionality of at least one of the functional elements of the control device 140 in accordance with aspects of the disclosure.

Figure 5:
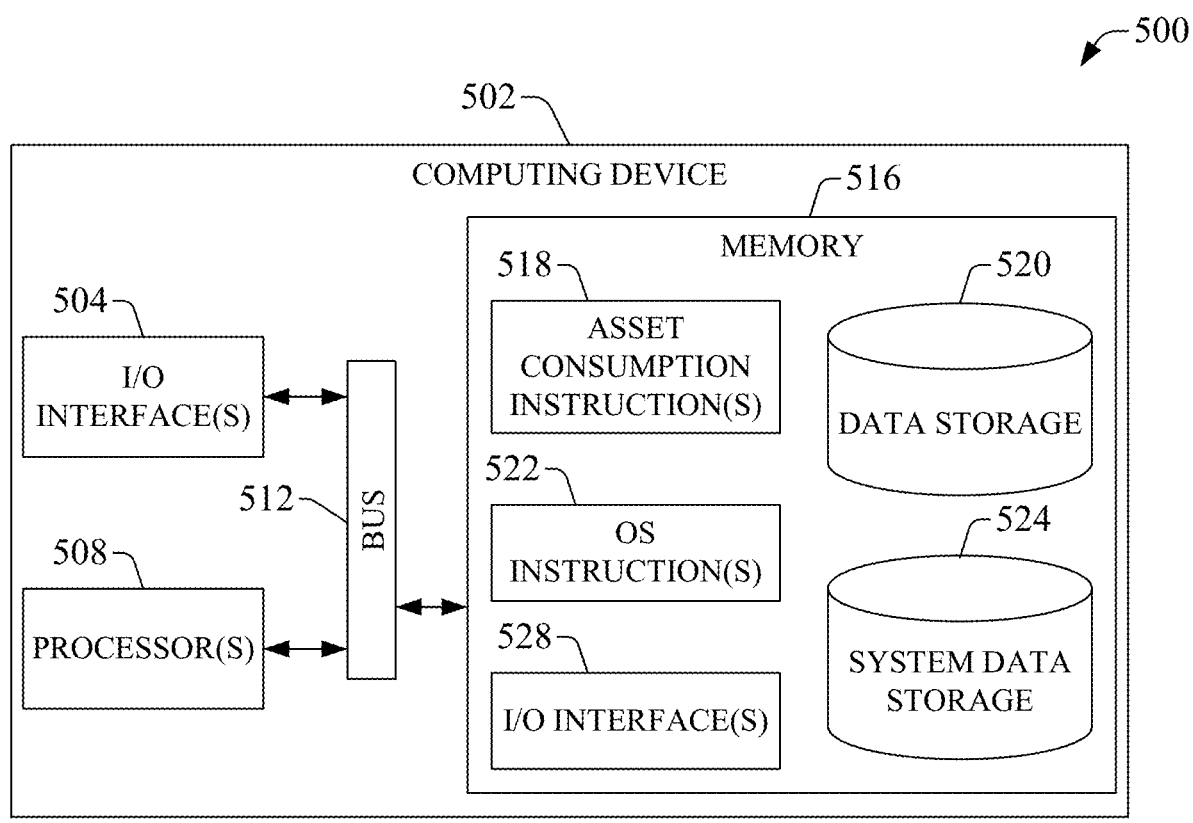
FIG. 5 illustrates an example embodiment of a computing device in accordance with one or more aspects of the disclosure.

FIG. 5 illustrates an example embodiment 500 of a computing device for consumption of content in a device (e.g., an end-point rendering device) in accordance with aspects of the subject disclosure. The computing device 502 can embody the distribution server 124 described herein. In the illustrated embodiment, device 502 comprises one or more input/output (I/O) interface(s) 504, one or more processor(s) 508, a memory 516, and a bus 512 that functionally couples various system components including the one or more processor(s) 508 to the memory 516. In the case of multiple processors comprising the group of processors 508, the device 510 can exploit concurrent computing.

The functionality of the device 502 can be configured by at least a group of computer-executable instructions (e.g., programming code instructions or programming modules) that can be executed by a processor of the one or more processor(s) 508. The group of computer-executable instructions can form one or more programming modules. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the processor.

Any number of computer-executable instructions (such as programming code instructions) or programming modules can be retained in memory 516. Data and computer-accessible instructions, e.g., computer-readable and computer-executable instructions, related to exchange of information (data, metadata, and/or signaling) associated with consumption of a time-shifted asset in accordance with aspects described herein can be retained in memory 516. In one aspect, a memory element which is represented as the asset administration data 520, can comprise a variety of data and metadata related to indirect control of media consumption in an appliance (e.g., appliance 140) in accordance with aspects of the disclosure. In another aspect, computer-accessible instruction(s) embodying or comprising one or more asset consumption instruction(s) can be retained in memory 516 within memory element 518, which is represented with a block labeled asset consumption instruction(s). In the subject specification and annexed drawings, memory elements are illustrated as discrete blocks; however, such memory elements and related computer-executable instructions and data can reside at various times in different storage elements (registers, files, memory addresses, etc.; not shown) in memory 516. In yet another aspect, the asset consumption instruction(s) 518 can be stored as an implementation (e.g., a compiled instance) of one or more computer-executable instructions that implement and thus provide at least part of the functionality described herein in connection with the distribution server 124, for example. Asset consumption instruction(s) 518 also can be transmitted across some form of computer readable media.

Memory 516 can be embodied in a variety of computer-readable media. Example computer-readable media can be any available media that is accessible by a processor in a computing device, such as one of the one or more processor(s) 508 in the device 510, and comprises, for example, both volatile and non-volatile media, removable and non-removable media. As an example, computer-readable media can comprise "computer storage media," or "computer-readable storage media," and "communications media" in accordance with features described herein. Such storage media can be non-transitory storage media.

In one aspect, memory 516 can comprise computer-readable media in the form of volatile memory, such as random access memory (RAM), or non-volatile memory, such as read only memory (ROM). In one aspect, memory 516 can be partitioned into a system memory (not shown) that can contain data and/or programming modules that can enable essential operation and control of the computing device 502. As described herein, such program modules can be implemented (e.g., compiled and stored) in memory element 522, referred to as operating system (OS) instruction(s), whereas such data can be system data that is retained in memory element 524, referred to as system data. The OS instruction(s) 522 and system data 524 can be immediately accessible to and/or are presently operated on by at least one processor of the one or more processor(s) 508. Operating system 522 can comprise OSs such as Windows operating system, Unix, Linux, iOS and substantially any operating system for wireless or tethered computing devices. In another aspect, memory 516 can comprise other removable/non-removable, volatile/non-volatile computer non-transitory storage media. By way of example, memory 516 can include a mass storage unit (not shown) which can provide non-volatile storage of computer code, computer readable instructions, data structures, program modules, and other data for the device 502. As an example, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

In various embodiments of the disclosure, the mediated (or indirect) control of consumption of time-shifted asset at a device (e.g., a rendering device) that is effected in the disclosed systems and methods can be performed in response to execution of software components (e.g., one or more implementations of asset consumption instruction(s) 518) by a processor or computing device. In particular, yet not exclusively, to provide the specific functionality of the computing device 502, which can embody the distribution server 124, a processor of the one or more processor(s) 508 can execute at least a portion of the asset consumption instruction(s) 518, consuming a time-shifted content asset in accordance with one or more aspects of the disclosure.

In general, a processor of the one or more processor(s) 508 refers to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the one or more processor(s) 508 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage or enhance performance of the computing devices that can implement the various aspects of the subject disclosure. In another aspect, the one or more processor(s) 508 can be implemented as a combination of computing processing units.

The one or more input/output (I/O) interface(s) 504 can functionally couple (e.g., communicatively couple) the computing device 502 to a functional element of the network A 120 described herein. For example, in a scenario in which the computing device 502 embodies or comprises the distribution server 124, at least one of such interface(s) can functionally couple the computing device 502 to the device 110 via the transport network 250. In addition, at least one of the one or more interface(s) 504 can functionally couple the computing device 502 to the control device 140 via the core network platform 210.

In certain embodiments, the one or more I/O interface(s) 504 can include at least one port that can permit connection of the computing device 502 to peripheral devices, network adaptors, such as those that can be present in reference links, and other network nodes. In one aspect, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like.

At least one I/O interface of the one or more I/O interface(s) 504 can permit delivery of output (e.g., output data, output signaling) to another computing device or a peripheral device. Such output can represent an outcome, or result, of a method or action performed at the computing device 502. In one scenario, the output can comprise one or more of tuning information, control data (e.g., NPT data), or the like in accordance with aspects described. In another scenario, such output can be any representation (textual, graphical, aural, etc.) of data and/or signaling resulting from implementation (e.g., execution) of the disclosed methods (or processes) for controlling consumption of time-shifted content at an end-point device (e.g., device 110) that is remote to the computing device 502. In one embodiment in which the computing device 502 embodies the device 110, a representation of such data and/or signaling can be determined, at least in part, by a specific end-user interface utilized for controlling consumption of time-shifted content at the end-point device. In addition, or in the alternative, manipulation of such representation can be specific to the end-user interface. For instance, the end-user interface can permit manipulation, and processing, of the data and/or signaling in response to specific gestures, such pressure gestures including screen taps and/or screen swipes.

Bus 512 represents one or more of several types of bus structures, including a memory bus or memory controller, a peripheral bus, an accelerated graphics port, and a processor or local bus using any of a variety of bus architectures. As an example, and similarly, yet not identically, to bus 512, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like.

Figure 6:
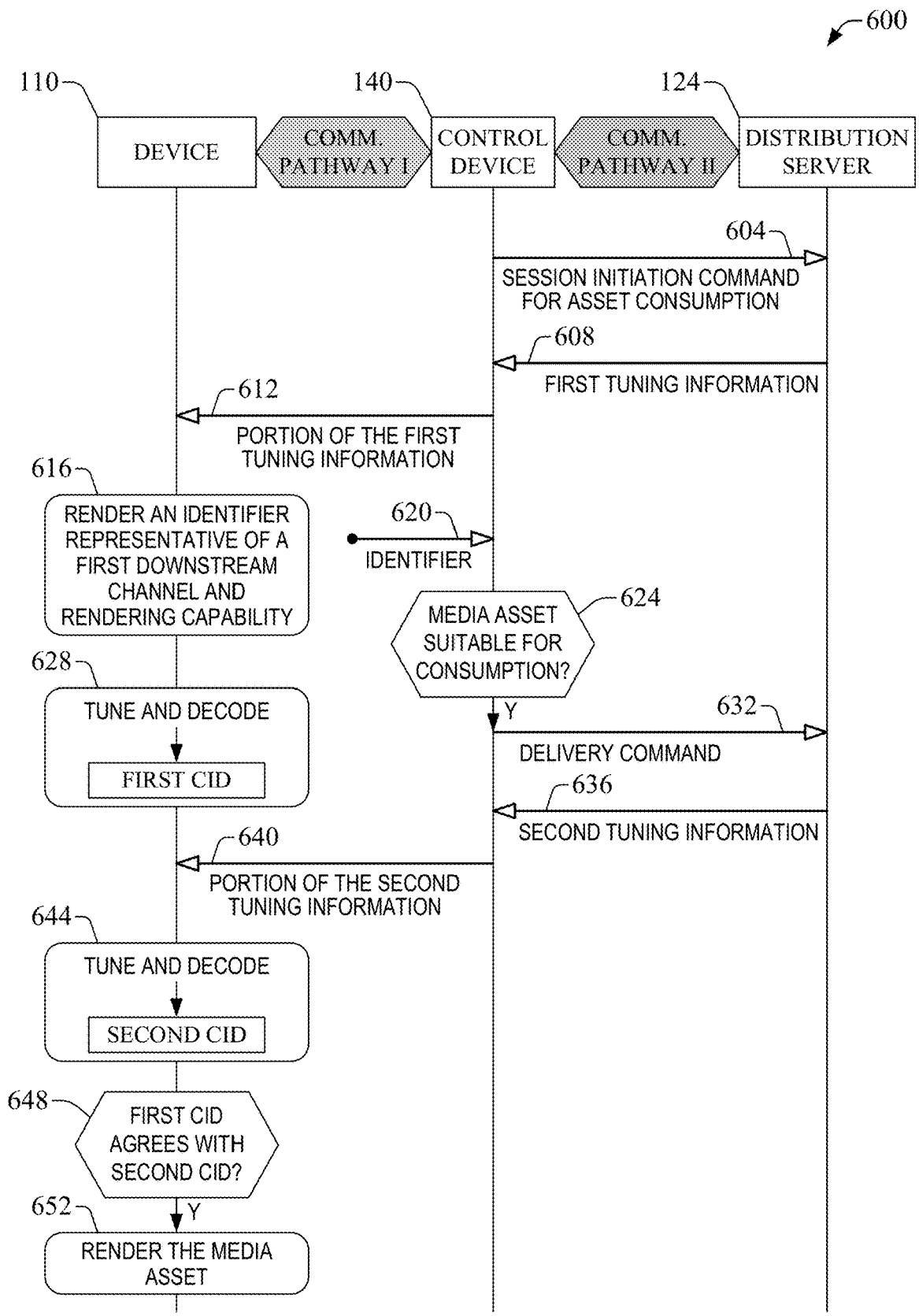
FIGS. 6-10 illustrate example methods according to one or more aspects described herein.
Figure 7:
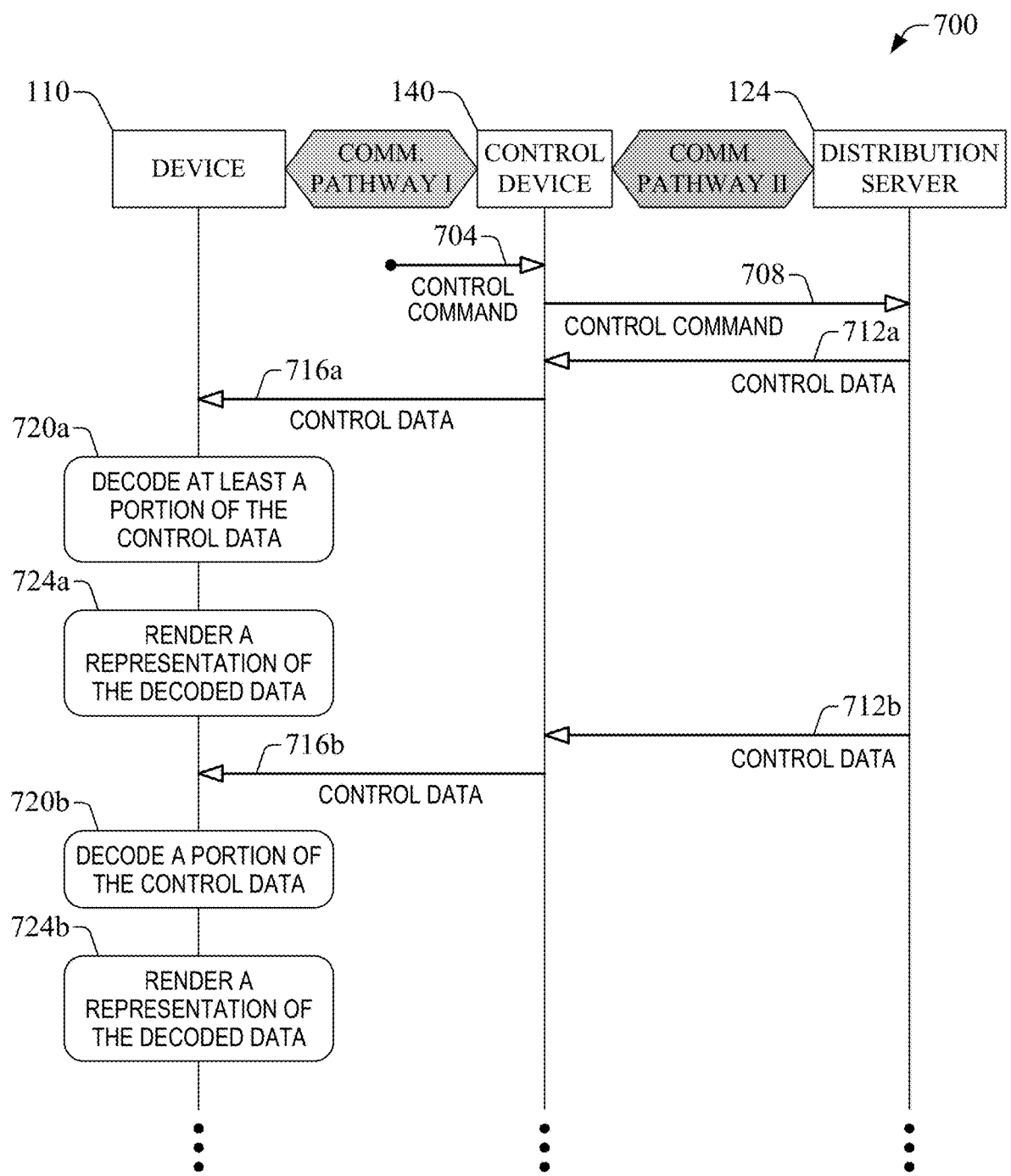
Figure 8:
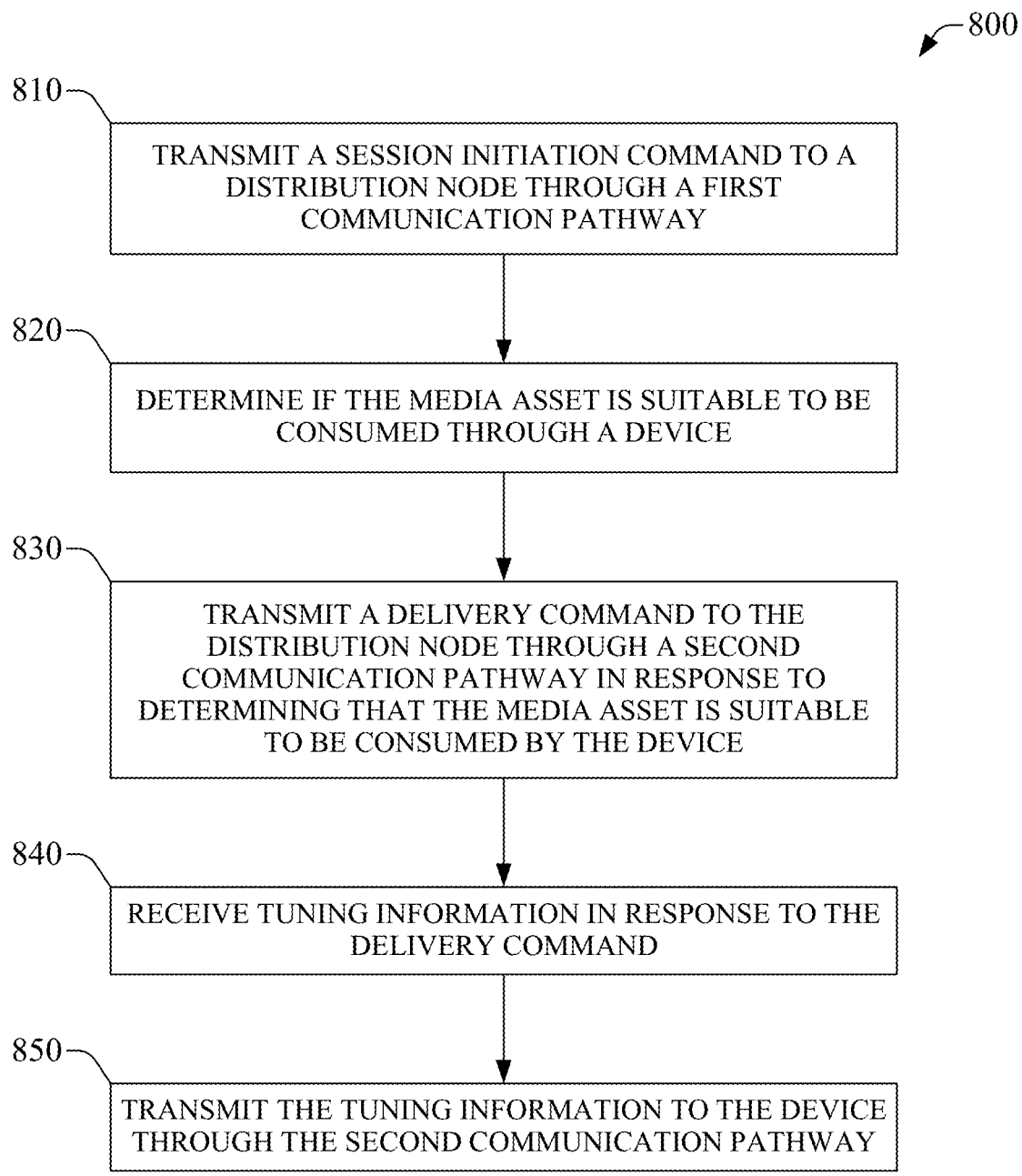
Figure 9:
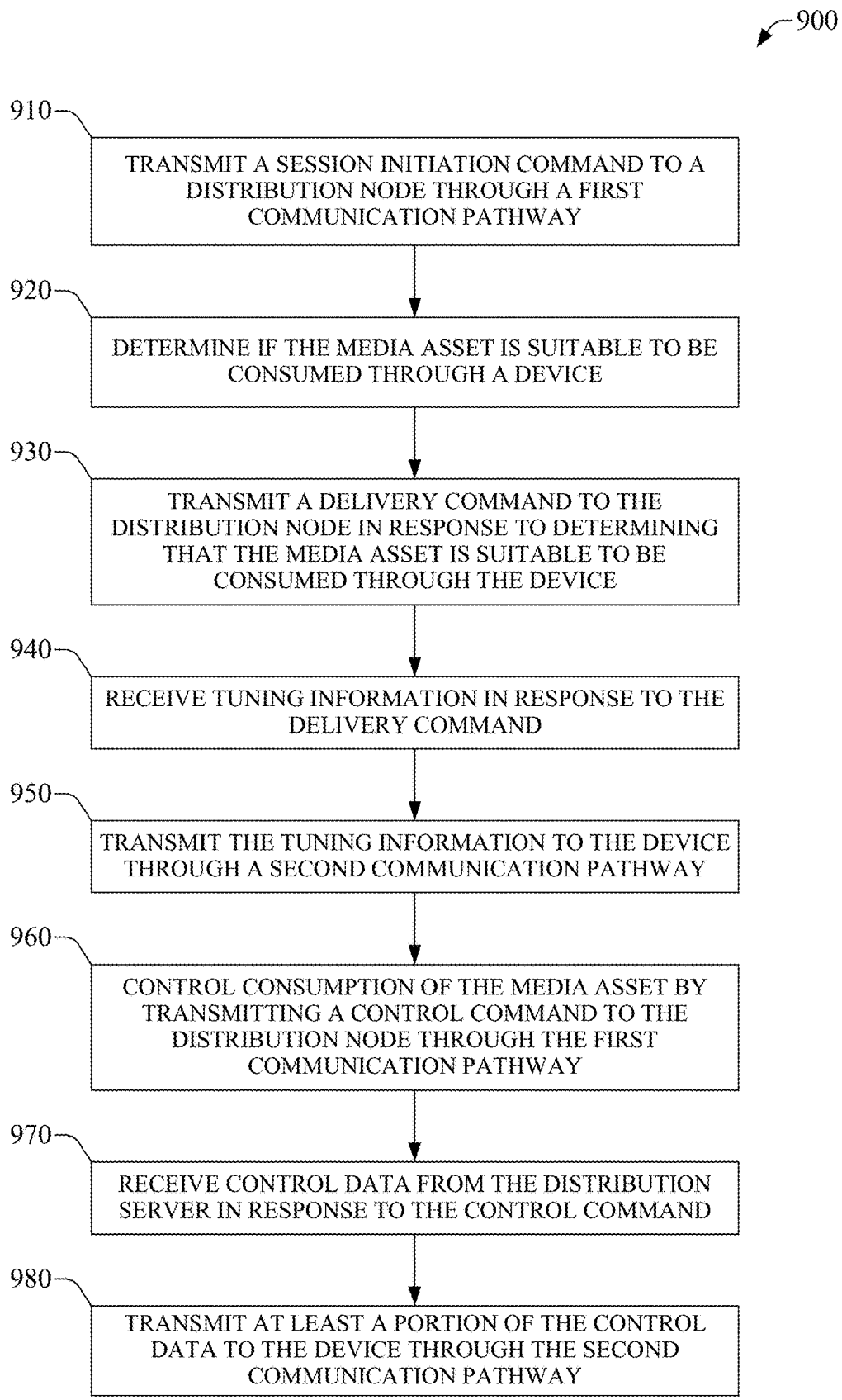
Figure 10:
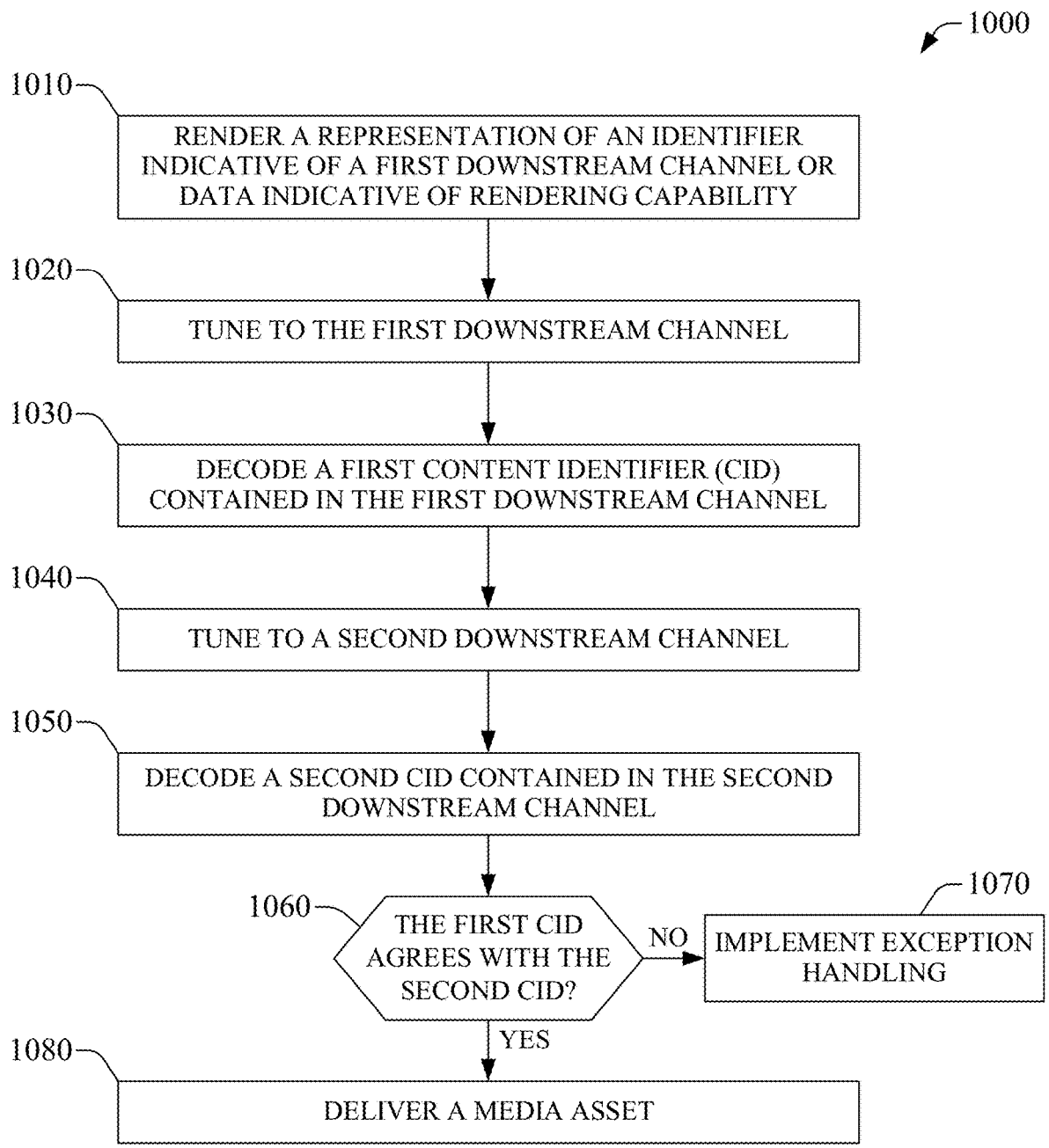

In view of the various aspects of consumption (e.g., delivery and/or control) of a media asset in a one-way device described herein, example methods that can be implemented in accordance with the disclosure can be better appreciated with reference to the example call flows in FIGS. 6-7 and example flowcharts in FIGS. 8-10. For simplicity of explanation, the example methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can alternatively be represented as a series of interrelated states or events, such as in a state diagram.

The methods disclosed throughout the subject specification can be stored on an article of manufacture, such as a computer-readable storage medium, to facilitate transporting and transferring such methods to computing devices (e.g., desktop computers, mobile computers, mobile telephones, and the like) for execution, and thus implementation, by a processor or for storage in a memory.

FIG. 6 is a call flow of an example method 600 for delivery of a media asset (or asset) to a device, such as an end-point rendering device, in accordance with one or more aspects of the disclosure. As described herein, the media asset can include or be embodied in a PPV asset, or a VOD asset, or a network-recorded DVR (nVDR) asset. The control device 140 can transmit a session initiation command 604 for asset consumption. As described herein, in one implementation, the session initiation command can be delivered in response to selection of an asset from a menu of media assets, the menu being rendered in the control device 140 and the asset being selected through one or more gestures (e.g., screen tap or touch, screen swipe, or the like). In another implementation, the session initiation command can be delivered in response to actuation of a logical address (e.g., a universal resource locator (URL)) conveyed in an information container, such as an email communication, a short message service (SMS) communication, a multimedia service (MMS) communication, a blog posting, or a posting in a social networking interface (such as a twitter client, a Facebook client, or the like). In response to such command, the distribution server 124 can transmit first tuning information 608 (e.g., data or metadata) to the control device 140, which can relay at least a portion 612 of the first tuning information 608 to the device 110. In one aspect, as described herein, the first tuning information can include information indicative of a first downstream channel (also referred to as frequency) and program indicator for a landing frame. In another aspect, the first tuning information also can comprise a first content identifier (CID), such as a first transport stream identifier (TSID). A CID can uniquely identify an information stream that can convey a media asset. In one embodiment, the landing frame can be an MPEG-formatted non-motion (or still) frame conveying a specific introductory message, such as "Welcome to On-Demand."

At block 616, the device 110 can render an identifier 620 (e.g., a numeric value or code (referred to, in certain embodiments as a "start code")) representative of a first downstream channel and rendering capability of the device 110. In one aspect, the rendering capability can include one or more of standard-definition (SD) rendering, high-definition (HD) rendering, H.264 rendering.

As illustrated, the identifier can be supplied to the control device 140 via a message 620. As described herein, in certain embodiments, the identifier can be a numeric hash that can be input into the control device 140. At block 624, the control device 140 can determine if the media asset is suitable for consumption. Performing such determination can include comparing type of the media asset with the rendering capability, as extracted from the identifier provided to the control device 140. In the affirmative case, the control device 140 can transmit a delivery command 632 containing information indicative of the first downstream channel (e.g., a service group). In response, the distribution server 124 can transmit second tuning information 636 to the control device 140. In one aspect, the second tuning information can include information indicative of a second downstream channel in which the media asset can be conveyed to the device 110. In another aspect, the second tuning information also can comprise a second CID, such as a TSID. The control device 140 relays (e.g., transmits) to the device 110 a portion 640 of the second tuning information.

At block 628, the device 110 can tune to the first downstream channel received in the first tuning information and can decode the first CID (e.g., the first TSID). It should be appreciated that, in one aspect, the order of implementation (e.g., execution) of blocks 624 and 628 can be reversed with respect to the illustrated order. In certain embodiments, such blocks can be implemented concurrently or nearly concurrently. In addition, at block 644, the device 110 can tune to the second downstream channel and can decode the second TSID.

At block 648, the device 110 determines if the first CID (e.g., the first TSID) and the second CID (e.g., the second TSID) agree. At block 652, in response to the first CID (e.g., the first TSID) and the second CID (e.g., the second TSID) being in agreement, the device 110 can render the media asset.

FIG. 7 is a call flow of an example method 700 for delivery of a media asset to a rendering device (which can be embodied in device 110, for example) in accordance with one or more aspects of the disclosure. As illustrated, the control device 140 can receive a control command 704. In one implementation, the control command 704 can be received from an end-user via a gesture for interaction with the control device 140. The control device 140 can relay the control command to the distribution server 124 within a message 708. In response to receiving the control command, the distribution server 124 can transmit control data 712a to the control device 140. In one aspect, the control data 712a can comprise acknowledgement signaling. In an embodiment in which the control command is directed to rewinding or fast-forwarding a media asset, the control data 712a can comprise timing information, such as a network play time (NPT) index (or indicator).

The control device 140 can transmit control data 716a to the device 110, the control data 716a comprising at least a portion of the control data 712a. In one aspect, the control data 716a can include additional signaling with respect to the control data 712a. For instance, in an embodiment in which the control command 704 is directed to rewinding the media asset, the control data 716a can comprise the timing information received in the control data 712a and information representative of the control command 704 being a command to rewind the media asset. In one implementation, the control data 716a can include the following information: "rewind=1, NPT=12." At block 720a, the device 110 can decode at least a portion of the control data 716a. At 724a, the device 110 can render a representation of the decoded data. In one implementation, such representation can comprise an on-screen display (OSD) transport bar or progress bar associated with implementation of the control command 704.

As illustrated, the distribution server 124a can transmit additional control data 712b to the control device 140, which can transmit control data 716b (comprising at least a portion of the control data 712a) to the device 110. Similarly, the device 110 can blocks 720b and 724b can decode a portion of the control data and render a representation of the decoded data, respectively. Additional cycles of control data delivery and processing (e.g., decoding and rendering) can be effected during indirect control (e.g., fast-forward, rewind, pause, or the like) of content rendered at the device 110. Such additional cycles not depicted, but are represented with ellipses.

FIG. 8 is a flowchart of an example method 800 for configuring delivery of a media asset in accordance with one or more aspects of the disclosure. In one aspect, the subject example method 800 can be implemented (e.g., compiled, linked, and executed; linked and executed; or executed) by a computing device, such as control device 140, or a processor integrated therein or functionally coupled thereto. At block 810, a session initiation command is transmitted to a distribution node (e.g., distribution server 124, a distribution device, or the like) through a first communication pathway (e.g., comm. pathway II), the session initiation command is directed to initiating consumption of a media asset. At block 820, it is determined if the media asset is suitable to be consumed through a device (e.g., a user device or a CPE), wherein the device can be configured to consume a plurality of media assets. In one embodiment, the device can be embodied in or can comprise the device 110. At block 830, a delivery command is transmitted to the distribution node through a second pathway (e.g., comm. pathway II), the delivery command is directed to proceeding with the consumption of the media asset. In one aspect, the delivery command is delivered in response to determining that the media asset is suitable to be consumed by the device (e.g., the user device). At block 840, tuning information is received in response to the delivery command. In one aspect, the tuning information can comprise data indicative of a first downstream channel of the plurality of downstream channels. In another aspect, receiving the tuning information further can comprise receiving information including data indicative of an information stream conveying the media asset, and data indicative of a content identifier (CID), such as a transport stream identifier (TSID), associated with the information stream. At block 850, the tuning information is transmitted to the device (e.g., device 110) through the second communication pathway.

FIG. 9 is a flowchart of an example method 900 for configuring and controlling delivery of a media asset in accordance with one or more aspects of the disclosure. In one aspect, the subject example method 900 can be implemented (e.g., compiled, linked, and executed; linked and executed; or executed) by a computing device, such as control device 140, or a processor integrated therein or functionally coupled thereto. Blocks 910-950, and implementation thereof, are substantially the same as blocks 810-850. At block 960, consumption of the media asset is controlled by transmitting a control command (e.g., a "Rewind" command, a "Fast-Forward" command, a volume change command) to the distribution node through the first communication pathway. At block 970, control data is received from the distribution node in response to the control command. At block 980, at least a portion of the control data is transmitted to the device through the second communication pathway.

FIG. 10 is a flowchart of an example method 1000 for delivering a media asset in accordance with one or more aspects of the disclosure. In one aspect, the subject example method 1000 can be implemented (e.g., compiled, linked, and executed; linked and executed; or executed) by a computing device, such as device 110, or a processor integrated therein or functionally coupled thereto. At block 1010, a representation of an identifier is rendered, the identifier is indicative of a first downstream channel or data indicative or rendering capability. At block 1020, the first downstream channel is tuned to. In one aspect, the computing device that implements the subject example method 1000 can tune to the first downstream channel. At block 1030, a first CID (e.g., a first TSID) contained in the first downstream channel is decoded. At block 1040, a second downstream channel is tuned to. In one aspect, the computing device that implements the subject example method 1000 can tune to the second downstream channel. At block 1050, a second CID (e.g., a second TSID) contained in the second downstream channel is decoded. At block 1060, it is determined if the first CID agrees with the second CID and, in the affirmative case, a media asset is delivered at block 1080. In the negative case, at block 1070, exception handling is implemented. For example, an error message can be delivered instead of delivery of the media asset. The error message can be aural, visual, physical (such as a vibration), or a combination thereof.

While the systems, apparatuses, and methods have been described in connection with example embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure being indicated by the following claims.

What is claimed is:

1. A method comprising:
receiving, by a distribution device via a computing device, an initiation command associated with delivery of a media asset to a user device configured to consume a plurality of media assets, wherein the user device is not configured for upstream communication;
causing the computing device to send a portion of first tuning information to the user device, wherein the user device is configured to render a non-motion picture contained in the first tuning information and a first identifier representative of a rendering capability of the user device;
sending, to the computing device, the first identifier representative of the rendering capability of the user device;
causing the computing device to determine based on the first identifier if the media asset is suitable to be consumed via the user device by comparing a type of the media asset with the rendering capability of the user device;
receiving, via the computing device, a delivery command comprising a second identifier indicative of a plurality of downstream channels; and
causing, based on the delivery command, the computing device to send second tuning information to the user device, wherein the second tuning information comprises data indicative of a first downstream channel of the plurality of downstream channels.

2. The method of claim 1, further comprising:
receiving, by the computing device, data indicative of an information stream conveying the media asset and a first content identifier (CID) associated with the information stream.

3. The method of claim 1, further comprising:
receiving, by the distribution device via the computing device, a control command associated with consumption of the media asset; and
causing, based on the control command, the computing device to send a portion of control data to the user device, wherein the control data is received by the computing device from the distribution device.

4. The method of claim 3, further comprising:
decoding, by the user device, the portion of the control data; and
generating, by the user device, a representation of the decoded control data.

5. The method of claim 1, wherein the first identifier is further indicative of a second downstream channel of the plurality of downstream channels.

6. The method of claim 5, wherein the user device is caused to tune to the second downstream channel based on receiving the first tuning information.

7. The method of claim 1, wherein the user device is caused to generate a representation of the first identifier based on receiving the first tuning information.

8. A method comprising:
receiving, by a user device, tuning information indicative of a first downstream channel and a first content identifier (CID), wherein the first CID is received in an information stream transported in the first downstream channel, the information stream comprising a media asset, wherein the user device is not configured for upstream communication, and wherein the user device is configured to render a non-motion picture contained in the tuning information and an identifier representative of a rendering capability of the user device;
sending, to a computing device, the identifier representative of the rendering capability of the user device;
causing the computing device to determine based on the identifier if the media asset is suitable to be consumed via the user device by comparing a type of the media asset with the rendering capability of the user device;
tuning, by the user device, to the first downstream channel;
decoding, by the user device, the first CID;
tuning, by the user device, to a second downstream channel;
decoding, by the user device, a second CID conveyed in the second downstream channel; and
causing, by the user device, output of the media asset based on the first CID corresponding to the second CID.

9. The method of claim 8, wherein the first CID comprises a first transport stream identifier (TSID).

10. The method of claim 8, wherein the second CID comprises a second transport stream identifier (TSID).

11. The method of claim 8, wherein the tuning information comprises a program identifier (PID).

12. The method of claim 8, wherein the identifier representative of the rendering capability of the user device is representative of the first CID.

13. The method of claim 8, wherein receiving the tuning information comprises receiving the tuning information from a control device.

14. The method of claim 8, wherein the tuning information comprises first tuning information, and the method further comprises receiving, from the control device, second tuning information indicative of the second downstream channel.

15. A method comprising:
receiving, by a user device, first tuning information indicative of a first downstream channel and a first content identifier (CID), wherein the user device is not configured for upstream communication, wherein the user device is configured to render a non-motion picture contained in the first tuning information and an identifier representative of a rendering capability of the user device;
receiving second tuning information indicative of a second downstream channel;
sending, to a computing device, the identifier representative of the rendering capability of the user device;
causing the computing device to determine based on the identifier if the media asset is suitable to be consumed via the user device by comparing a type of the media asset with the rendering capability of the user device;
determining, based on tuning to the first downstream channel, the first CID;
determining, based on tuning to the second downstream channel, a second CID; and
causing output of a media asset based on the first CID corresponding to the second CID.

16. The method of claim 15, wherein the first CID comprises a first transport stream identifier (TSID).

17. The method of claim 15, wherein the second CID comprises a second transport stream identifier (TSID).

18. The method of claim 15, wherein the tuning information comprises a program identifier (PID).

19. The method of claim 15, wherein the identifier representative of the rendering capability of the user device is representative of the first CID.

20. The method of claim 15, wherein the first CID is received in an information stream transported via the first downstream channel, and wherein the information stream comprises the media asset.

* * * * *